United States Patent
Lee et al.

(10) Patent No.: US 9,013,053 B2
(45) Date of Patent: Apr. 21, 2015

(54) MULTI-TYPE WIND TURBINE

(71) Applicant: Doosan Heavy Industries & Construction Co., Ltd., Changwon-si, Gyeongsangnam-do (KR)

(72) Inventors: Ki Hak Lee, Daejeon (KR); Sang Il Lee, Busan (KR); Jong Po Park, Changwon-si (KR)

(73) Assignee: Doosan Heavy Industries & Construction Co., Ltd., Changwon-si (KR)

( * ) Notice: Subject to any disclaimer, the term of this patent is extended or adjusted under 35 U.S.C. 154(b) by 37 days.

(21) Appl. No.: 13/678,212

(22) Filed: Nov. 15, 2012

(65) Prior Publication Data

US 2013/0127173 A1    May 23, 2013

(30) Foreign Application Priority Data

Nov. 17, 2011  (KR) .................. 10-2011-0120372
Dec. 14, 2011  (KR) .................. 10-2011-0134749
Oct. 24, 2012  (KR) .................. 10-2012-0118594

(51) Int. Cl.
*F03D 9/00* (2006.01)
*H02P 9/04* (2006.01)
*F03D 1/02* (2006.01)

(52) U.S. Cl.
CPC *F03D 9/002* (2013.01); *F03D 1/02* (2013.01); *F03D 1/025* (2013.01); *Y02E 10/721* (2013.01); *Y02E 10/725* (2013.01); *Y02E 10/726* (2013.01)

(58) Field of Classification Search
CPC ............ F03D 9/002; F03D 9/00; F03D 1/02; F03D 1/06; F03D 7/00
USPC ............ 290/44, 55, 51; 415/4.1, 4.2, 4.5, 2.1, 415/905; 416/7, 132 B, 111, 112
See application file for complete search history.

(56) References Cited

U.S. PATENT DOCUMENTS 1,804,016 A * 5/1931 Koenig et al. ............ 416/175
4,039,848 A * 8/1977 Winderl ..................... 290/55

(Continued)

FOREIGN PATENT DOCUMENTS

JP   2003-526757 A   9/2003
KR   1996-0007401 B1   5/1996

(Continued)

OTHER PUBLICATIONS

Office Action dated Nov. 15, 2013 issued in Korean Patent Application No. 10-2012-0118594.

*Primary Examiner* — Tulsidas C Patel
*Assistant Examiner* — Charles Reid, Jr.
(74) *Attorney, Agent, or Firm* — Sughrue Mion, PLLC

(57) ABSTRACT

A multi-type wind turbine is provided such that a plurality of arms are combined with one tower in a radial direction, and a unit generator having a blade is provided at the plurality of arms, respectively, and at least two of the unit generators are rotated in opposite directions to each other. Furthermore, both ends of the arm may be located both sides thereof on the basis of the height directional central line of the tower to be fixed thereto or both ends of the arm may be located at one side of the tower to be rotatably combined therewith. Furthermore, the rotation speed and tilt angle of the blade of the unit generator may controlled in an individual manner or controlled in a grouped manner. Furthermore, the unit generator may include a main blade and a sub-blade which is smaller than the main blade.

17 Claims, 20 Drawing Sheets

(56) References Cited

U.S. PATENT DOCUMENTS

| | | | |
|---|---|---|---|
| 4,065,225 A * | 12/1977 | Allison | 416/121 |
| 4,083,651 A * | 4/1978 | Cheney et al. | 416/11 |
| 4,110,631 A * | 8/1978 | Salter | 290/55 |
| 4,143,992 A * | 3/1979 | Crook | 415/220 |
| 5,876,181 A * | 3/1999 | Shin | 415/2.1 |
| 6,465,902 B1 * | 10/2002 | Beauchamp et al. | 290/55 |
| 6,914,339 B2 * | 7/2005 | Rios-Vega | 290/1 R |
| 7,074,011 B1 * | 7/2006 | Wobben | 416/126 |
| 7,988,413 B2 * | 8/2011 | Haar | 416/31 |
| 7,993,096 B2 * | 8/2011 | Anderson et al. | 415/4.2 |
| 2003/0170123 A1 | 9/2003 | Heronemus | |
| 2007/0024060 A1 * | 2/2007 | Bacon | 290/55 |
| 2008/0106102 A1 * | 5/2008 | Liao | 290/55 |
| 2009/0129931 A1 * | 5/2009 | Stiesdal | 416/204 R |
| 2009/0196748 A1 * | 8/2009 | Salter | 416/120 |
| 2011/0140428 A1 * | 6/2011 | Wakata et al. | 290/44 |
| 2011/0221204 A1 * | 9/2011 | Kim et al. | 290/55 |
| 2011/0229322 A1 * | 9/2011 | Tadayon et al. | 416/91 |
| 2012/0001431 A1 * | 1/2012 | Smith | 290/53 |
| 2012/0125876 A1 * | 5/2012 | Park et al. | 212/312 |
| 2013/0106109 A1 * | 5/2013 | Richert et al. | 290/44 |
| 2013/0134711 A1 * | 5/2013 | Spruce | 290/44 |

FOREIGN PATENT DOCUMENTS

| | | |
|---|---|---|
| KR | 10-2010-0062305 A | 6/2010 |
| WO | 98/32968 A1 | 7/1998 |
| WO | 2007/057021 A1 | 5/2007 |

* cited by examiner

MULTI-TYPE WIND TURBINE

CROSS-REFERENCE TO RELATED APPLICATIONS

The present disclosure relates to subject matters contained in priority Korean Application No. 10-2011-0120372, filed on Nov. 17, 2011, Korean Application No. 10-2011-0134749, filed on Dec. 14, 2011 and Korean Application No. 10-2012-0118594, filed on Oct. 24, 2012, which are herein expressly incorporated by references in its entirety.

BACKGROUND OF THE INVENTION

1. Field of the Invention

The present disclosure relates to a multi-type wind turbine having a plurality of unit generators in one tower.

2. Description of the Related Art

Wind power generation refers to a generation method of converting energy generated by wind into mechanical energy (rotational force) through a spindle using a windmill, and allowing the mechanical energy to drive a generator, thereby obtaining electrical power converted into electrical energy.

Wind power generation has the highest economic efficiency among energy sources that have been developed up to the present as well as provides an advantage capable of generating electricity using wind which is a clean energy source with no cost for an indefinite period of time, and thus active investment has been made by American, Asian as well as European developers.

The foregoing wind turbine for wind power generation may be divided into a vertical shaft wind turbine and a horizontal shaft wind turbine according to the direction of the rotation shaft. Up to now, the horizontal shaft wind turbine has high efficiency and stable performance compared to the vertical shaft wind turbine, and therefore, the horizontal shaft wind turbine has been mostly applied to the commercial wind power complex.

In order to obtain more power, a typical horizontal type wind generator should have an increased size of blade or should be mounted with a generator having a capacity corresponding to the size of the blade. However, as increasing the size of the blade or increasing the capacity of the generator, the weight of the generator may be increased and thus the scale of the tower and structure for supporting such a heavy blade and generator should be also increased. As a result, when a power generation facility including the blade and generator is increased in weight, the weight of components such as bearings for supporting the weight should be also increased, and a separate particular device for a yaw operation should be installed to rotate the direction of a rotary blade according to the direction of wind.

Due to this, the installation and maintenance cost increases by geometric progression, thereby resulting in a problem of causing a significant obstacle in the broad distribution of wind turbines due to an increase of technical degree of difficulty and cost.

Taking this into consideration, in recent years, a multi-type wind turbine in which a plurality of generator units are disposed along a circumferential direction around one tower as illustrated in FIG. 1 has been known. For the multi-type wind turbine, one main nacelle 2 is installed for one tower 1, and a plurality of support arms 3 are rotatably combined with the main nacelle 2 in a radial direction, and a unit generator (G) is installed for each of the support arms 3, respectively. The unit generator (G) may include a sub-nacelle 4 including a generator (not shown), a rotor (not shown) rotatably combined with the sub-nacelle 4, and a small-sized blade 5 combined with the rotor to be rotated together with the rotor.

The foregoing multi-type wind turbine may increase the number of unit generators (G) without increasing the size of the blade 5 to obtain a lot of power, and thus it is not required to excessively increase the scale of the tower 1 and structure since the weight of the blade 5 is not excessively increased, and as a result, the size of components such as bearings for supporting each unit generator (G) may not be increased, thereby reducing the installation and maintenance cost.

However, though having the above advantages, according to the forgoing multi-type wind turbine in the related art, as the support arm 3 is rotated with respect to the main nacelle 2, the variation of wind speed is terrible, the noise is aggravated, and the fatigue load of a system is increased as well as the structural strength of the support arm 3 is weakened, thereby resulting in a problem that it cannot be applicable to a large capacity of unit generator (G).

Furthermore, according to a multi-type wind turbine in the related art, each unit generator (G) is disposed in a downwind format at a front surface of the tower 1 and thus it may be difficult to maintain a gap (t1) between a blade edge of each blade 5 and the tower 1, thereby resulting in that the blade 5 can be damaged and collided with the tower 1.

In addition, according to a multi-type wind turbine in the related art, the weight of one blade is significant and thus a lot of energy should be consumed to control the angle of each blade according to the wind conditions as well as the reaction speed is slow, and the aerodynamic performance is decreased to reduce the amount of energy production as the vicinity of a blade root is formed in a cylindrical shape, and the speed at a blade edge should be increased in order to enhance the amount of energy production, thereby increasing the noise.

SUMMARY OF THE INVENTION

An object of the present disclosure is to provide a multi-type wind turbine with a low wind speed variation and noise and a low system fatigue load that can be easily applicable to a large capacity of unit generator.

Furthermore, another object of the present disclosure is to provide a multi-type wind turbine capable of maintaining a sufficient gap between the blade and tower, thereby enhancing the stability and reliability.

In addition, still another object of the present disclosure is to provide a multi-type wind turbine capable of reducing energy consumed while controlling the angle of a blade according to the wind conditions as well as promptly controlling the angle, increasing the aerodynamic performance in the vicinity of a blade root to increase the amount of energy production, and reducing the noise due to the rotation of a blade even in a lower wind speed condition.

In order to accomplish the foregoing object of the present disclosure, there may be provided a multi-type wind turbine including a tower; a plurality of arms provided in the tower in a radial direction; a nacelle provided at the arms, respectively, to form a unit generator; and a blade combined with the nacelle, respectively, to form a unit generator together with the nacelle, wherein at least two of the unit generators have opposite blade rotation directions to each other.

Here, the unit generators adjacent to each other along a circumferential direction may have opposite blade rotation directions to each other, or the unit generators may be classified into a plurality of regions based on the height direction of the tower such that the rotation speeds, tilt angles or lengths of the blades are different from one another based on the region.

Furthermore, the plurality of arms may be fixed and combined with the tower.

Furthermore, a nacelle may be provided in the tower, and the plurality of arms may be rotatably combined with the nacelle.

In addition, in order to accomplish the foregoing object of the present disclosure, there may be provided a multi-type wind turbine including a tower; a plurality of arms fixed to the tower in a radial direction; a nacelle provided at the arms, respectively, to form a unit generator; and a blade combined with the nacelle, respectively, to form a unit generator together with the nacelle, wherein the arm is provided such that a stationary point fixed to the tower and a stationary point combined with the unit generator are located at both sides thereof, respectively, on the basis of the height directional central line of the tower.

Furthermore, the plurality of arms may be combined with one another by means of a reinforcement member, or the plurality of arms may be supported by a reinforcement member combined with the tower.

In addition, in order to accomplish the foregoing object of the present disclosure, there may be provided a multi-type wind turbine including a tower; a plurality of arms provided in the tower in a radial direction; a nacelle provided at the arms, respectively, to form a unit generator; a blade combined with the nacelle, respectively, to form a unit generator together with the nacelle; and a wind speed corresponding controller configured to control the rotation speed or tilt angle of the blade to correspond to a wind speed, wherein at least two of the unit generators have opposite blade rotation directions to each other.

Furthermore, the wind speed corresponding controller may be electrically connected to a location sensor for detecting the height of the unit generator to control the rotation speed or tilt angle of the blade based on a value detected by the location sensor.

Furthermore, the wind speed corresponding controller may control the rotation speed or tilt angle of the blade for the each unit generator, or bind the plurality of unit generators into a plural number of groups to control them in a grouped manner, or control them based on the location thereof.

Furthermore, the wind speed corresponding controller may divide any region based on the height into a plural number of groups, and control the unit generators falling on the any region to have a predetermined rotation speed or tilt angle.

Furthermore, the arm may further include a transfer unit for maintenance.

Furthermore, the plurality of arms may be rotatably combined with respect to the tower, and a brake unit for maintaining a braking state of the arm may be further provided between the tower and the arm.

Furthermore, the blade may be combined with a wind direction in a upwind format.

Furthermore, the blade may have a duct to surround each blade edge.

Furthermore, the blade may include a main blade having a large rotation radius and a sub-blade having a small rotation radius, and stationary portion may be formed at the blade root of the main blade in a pillar shape close to a circular cross section or circularity, and aerodynamic portion may be formed from an end of the stationary portion to a blade edge thereof in a plate shape having a curve, and the sub-blade may be formed such that at least part of the aerodynamic portion is located within a range of the stationary portion of the main blade.

A multi-type wind turbine according to the present disclosure may have a low wind speed variation and reduced noise to reduce a system fatigue load, and a structural strength of the support arm may be reinforced to be easily applicable to a large capacity of unit generator, thereby implementing a large capacity wind turbine.

Furthermore, a gap between the blades and tower may be sufficiently maintained to prevent the blades from being damaged and collided with the tower, thereby enhancing the stability and reliability of a wind turbine.

Furthermore, a transfer unit may be provided in the arm to facilitate the maintenance of a unit generator, and a duct may be provided in the outside of the blades to enhance the wind power effect.

Furthermore, the blade of the unit generator may include a main blade and a sub-blade to reduce energy consumed while controlling the angle of the blade according to the wind conditions as well as promptly control the angle, thereby enhancing the energy efficiency.

Furthermore, the aerodynamic performance of a blade may be increased even in a lower wind speed condition to enhance the amount of energy production as well as the same energy may be produced even with a reduced rotation speed due to an increased rotational torque of the blade, thereby reducing noise due to the rotation of the blade.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a multi-type wind turbine according to the present disclosure will be described in detail based on an embodiment illustrated in the accompanying drawings.

Figure 1:
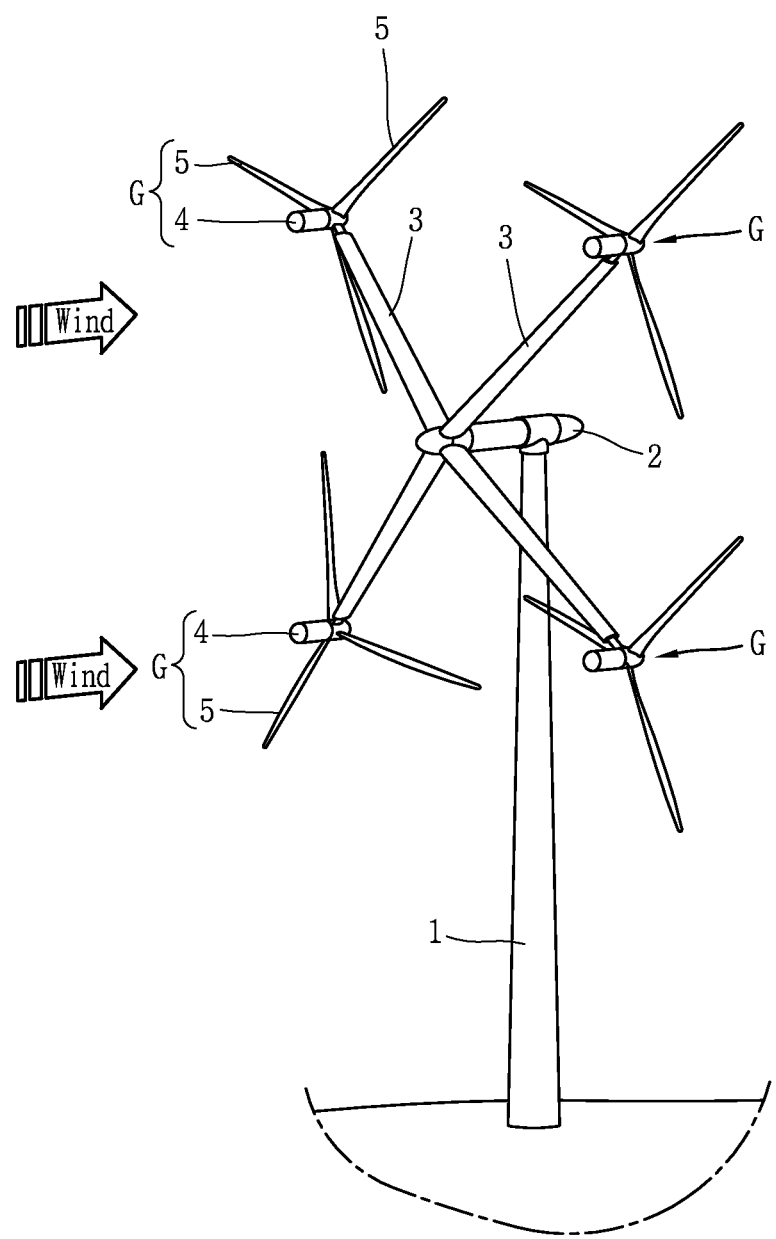
FIG. 1 is a perspective view illustrating an example of a multi-type wind turbine in the related art.
Figure 2:
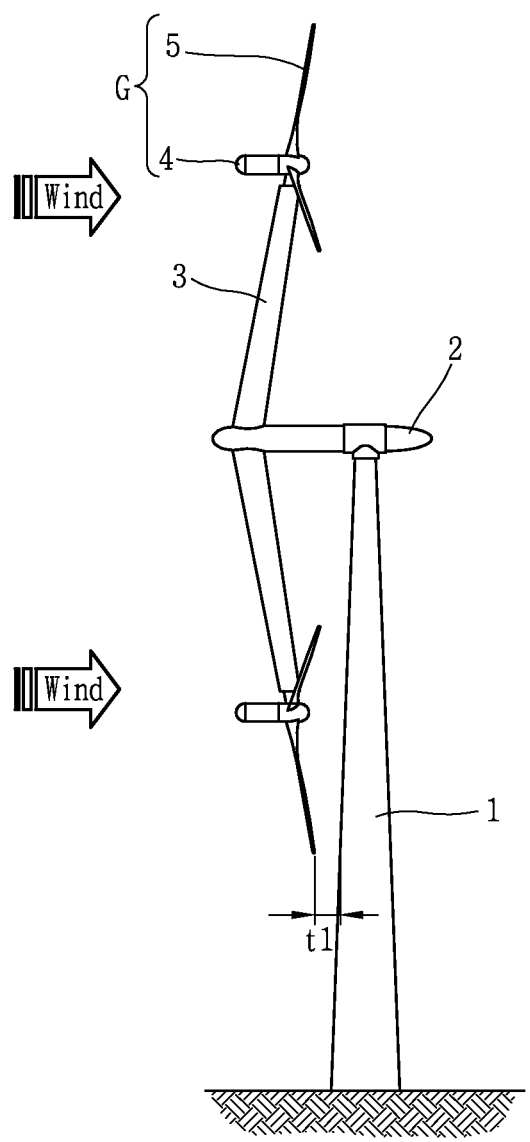
FIG. 2 is a side view illustrating a wind turbine according to FIG. 1.
Figure 3:
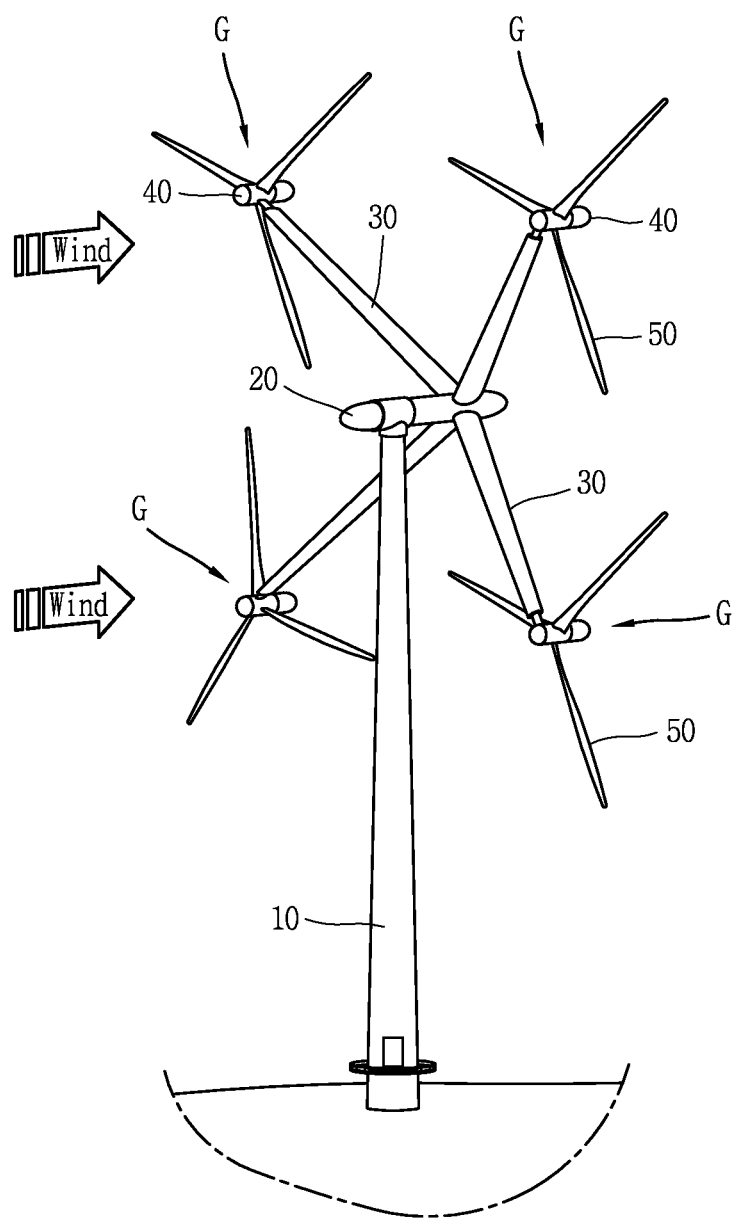
FIG. 3 is a perspective view illustrating an example of a multi-type wind turbine according to the present disclosure.
Figure 4:
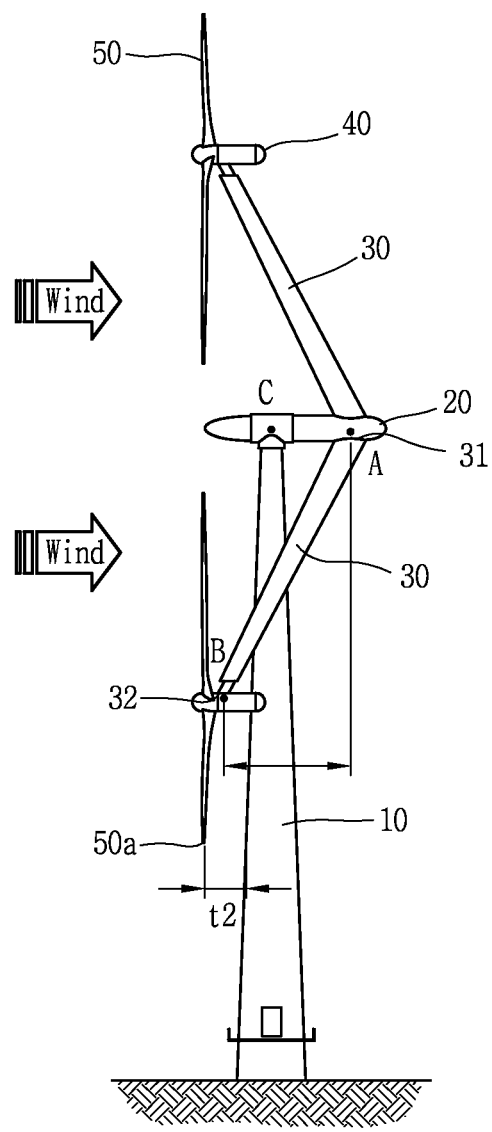
FIGS. 4 and 5 are a side view and a front view illustrating a wind turbine according to FIG. 3.
Figure 5:
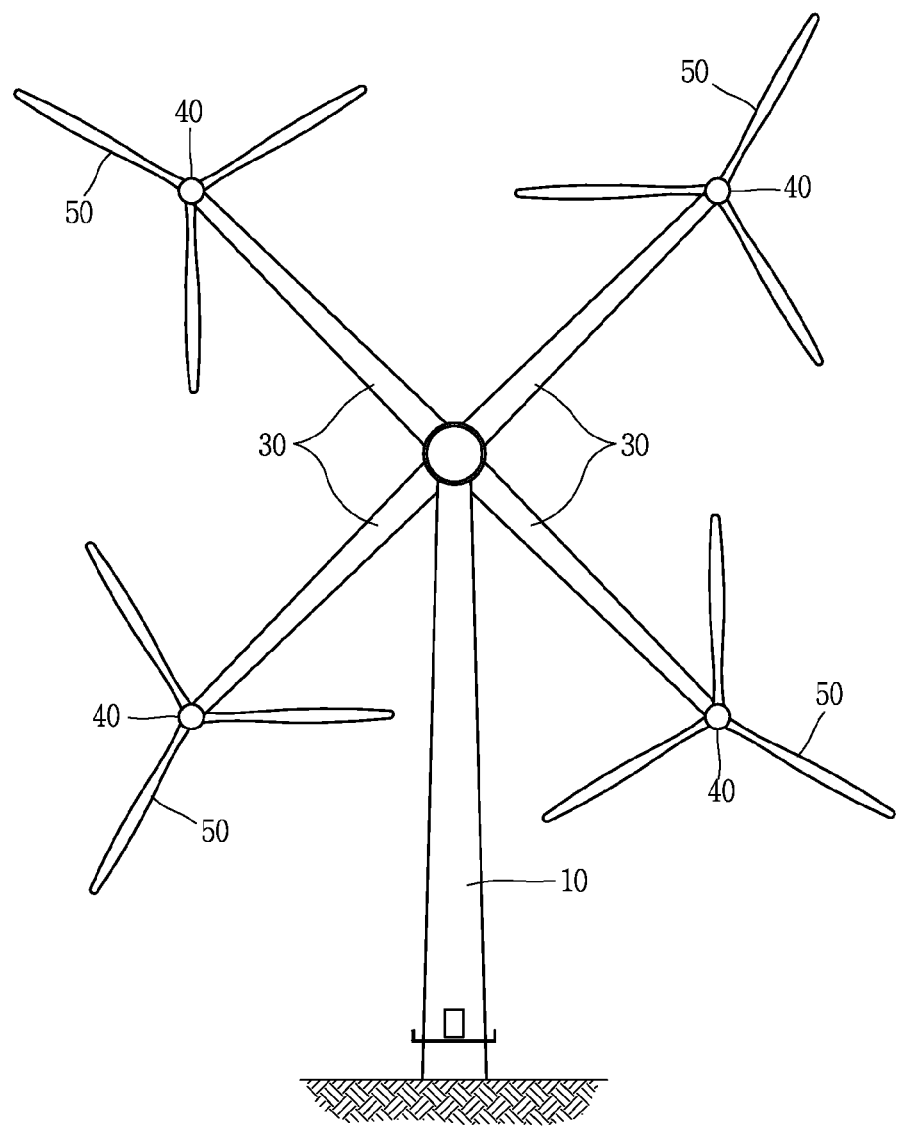

FIG. 3 is a perspective view illustrating an example of a multi-type wind turbine according to the present disclosure, and FIGS. 4 and 5 are a side view and a front view illustrating a wind turbine according to FIG. 3.

As illustrated in the drawings, a multi-type wind turbine according to the present disclosure may include a tower 10 raised up and installed from the ground at a predetermined height, and a plurality of unit generators (G) arranged in a radial direction around an upper end of the tower 10 to generate electricity individually while being rotated with different directions or different rotation speeds by a wind speed. The unit generator (G) may include a sub-nacelle 40 which will be described later and a plurality of blades 50 combined with the sub-nacelle 40.

The tower 10 may be formed in a truncated conical shape in which an outer diameter of the bottom end thereof is larger than that of the top end thereof and the inside thereof is vacant. Furthermore, stairs, a conveyer or an elevator may be installed within the tower 10 to transfer the operator or working equipment for the maintenance of the unit generator.

The unit generator (G) may be fixed and combined with the tower 10 using a support arm 30 which will be described later or rotatably combined with respect to the tower 10 together with a blade arm 130 which will be described later. A scheme in which the unit generator (G) is fixed and combined with the tower 10 may be referred to as a fixed type turbine, and a scheme in which the unit generator (G) is rotatably combined therewith may be referred to as a rotation type turbine.

For the fixed type turbine, a main nacelle 20 may be fixed and combined with an upper end of the tower 10 in a horizontal direction, and a plurality of support arms 30 may be fixed and combined with the main nacelle 20 to be extended in a radial direction, and the unit generator (G) may be combined with an end of the support arm 30.

Here, only the external appearance of the main nacelle 20 may be formed with a typical nacelle shape because the support arm 30 does not performs the role of a blade, and thus the gear box, generator or the like may not be provided therein. Of course, it may be allowed to form the main nacelle itself with a frame having a simple rod shape instead of a nacelle shape.

Figure 6:
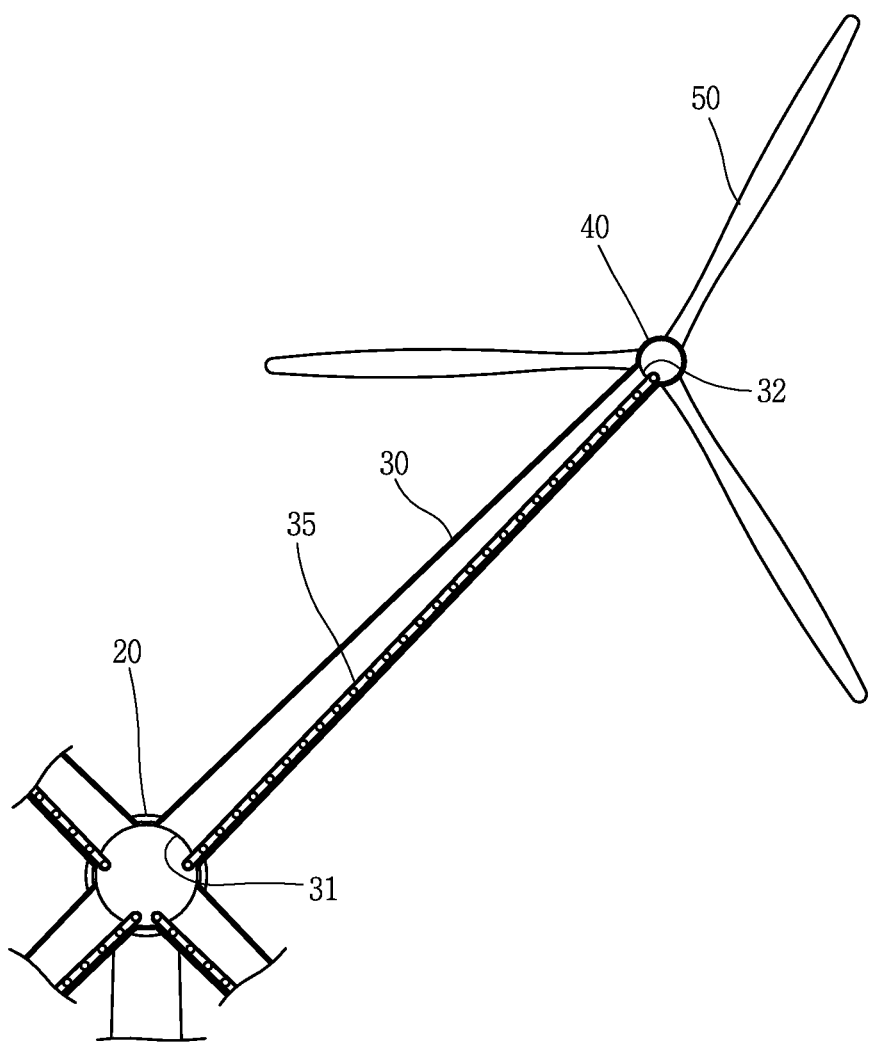
FIG. 6 is a schematic view illustrating the inside of a support arm in a wind turbine according to FIGS. 4 and 5.

The support arm 30 may be formed to have a smaller outer diameter as it is located away from the main nacelle 20 and fixed and combined with an outer circumferential surface of the main nacelle 20 in a radial direction. Furthermore, the inside of the support arm 30 may be formed in a rod shape filled inside, but in case of an extra-large one, stairs or a conveyer 35 as well as transfer equipment such as an elevator may be installed therein for the maintenance of the unit generator (G) as illustrated in FIG. 6.

The support arm 30 may be preferably arranged with the same interval along the circumferential direction to maximize a rotation radius of the blade 50 which will be described later as well as have a left/right balance among components arranged at both sides of the tower 10. For example, in case where the number of support arms is four as illustrated in FIG. 5, the support arms 30 may be arranged to be perpendicular to each other, and preferably two support arms may be arranged at both sides thereof, respectively, to be symmetrical to each other on the basis of the height directional central line of the tower 10. Of course, the arrangement may be allowed anyway in case where the number of support arms including the unit generator is at least two.

As illustrated in FIG. 4, the support arm 30 may include a first end 31 combined with the main nacelle 20, and a second end 32 extended from the first end 31 to be combined with the sub-nacelle 40 which will be described later. The first end 31 and second end 32 of the support arm 30 may be both installed to be located at a front side of the tower 10 (hereinafter, an upstream side on the basis of a flowing direction of wind is referred to as a front side). However, as illustrated in FIG. 4, they may be disposed in an inclined manner such that the first end 31 of the support arm 30 may be located at a rear side of the tower 10 and the second end 32 may be located at a front side thereof. Accordingly, the support arm 30 is traversed across the tower 10 in an inclined manner such that stationary points (A, B) at both ends are located at both sides of the tower 10, respectively, and as a result, the sub-nacelle 40 which will be described later is located at a front side of the tower 10. Hence, a vertical load of the support arm 30 being applied to the main nacelle 20 may be dispersed, thereby preventing damage due to a concentrated load on the stationary point (C) at which the tower 10 and the main nacelle 20 are combined with each other.

The sub-nacelle 40 may be formed with a typical nacelle shape having the gear box and generator, and fixed and combined with each second end 32 of the support arm 30, respectively.

A plurality of blades 50 may be rotatably combined with a front side of the sub-nacelle 40, and a wind vane (not shown) for supporting a yaw operation that the sub-nacelle 40 is rotated together with a wind direction may be installed at a rear side of the sub-nacelle 40.

The plurality of blades 50 may be installed in so-called a upwind format, respectively. Accordingly, as illustrated in FIG. 4, a distance (t2) between an edge 50a of the blade 50 and the tower 10 may be maintained above a predetermined distance to the extent that the blade 50 is not collided to the tower 10.

In this manner, in a multi-type wind turbine according to the present disclosure, the support arms are fixed and combined with the main nacelle fixed to the tower, thereby reducing an increase of wind speed variation and noise that can occur during the rotation of the support arm and a system fatigue load thereof. Furthermore, as the support arm is arranged from a rear side thereof to a front side thereof on the basis of the height directional central line of the tower while at the same time the support arm is fixed to the tower together with the main nacelle, a structural strength of the support arm may be enhanced as well as an eccentric load is cancelled out, thereby greatly increasing the capacity of each generator made of a sub-nacelle and a blade. As a result, it may be possible to implement a large capacity wind turbine.

Furthermore, each blade is combined with the sub-nacelle installed at an end of the support arm 30 in a downwind format, thereby minimizing a distance between stationary points at both ends of the support arm as well as maintaining a gap between the end of the blades and the tower. Accordingly, it may be possible to prevent the blades from being damaged while being collided with the tower in advance.

On the other hand, in a multi-type wind turbine according to present disclosure, as a plurality of unit generators are arranged along a circumferential direction of the tower, each unit generator is located away from the height directional central line of the tower by a length of the support arm as well as the blade of each unit generator is rotated, and thus the each unit generator generates a rotational moment around the tower. Accordingly, the multi-type wind turbine receives a severe eccentric load in the left-right direction (in the direction horizontally perpendicular to the front-rear direction) by a rotational moment generated by each unit generator and thus a reinforcement structure having a high rigidity may be required to stably support the wind turbine as well as it may be a restriction on increasing the capacity of each unit generator to implement a large capacity wind turbine.

According to the present embodiment, the blades 50 of each unit generator (G) may be configured to rotate in different directions from each other, and thus a rotational moment generated from the each unit generator (G) may be cancelled out during the rotation of the blades 50, thereby reducing an eccentric load in the left-right direction.

Figure 7:
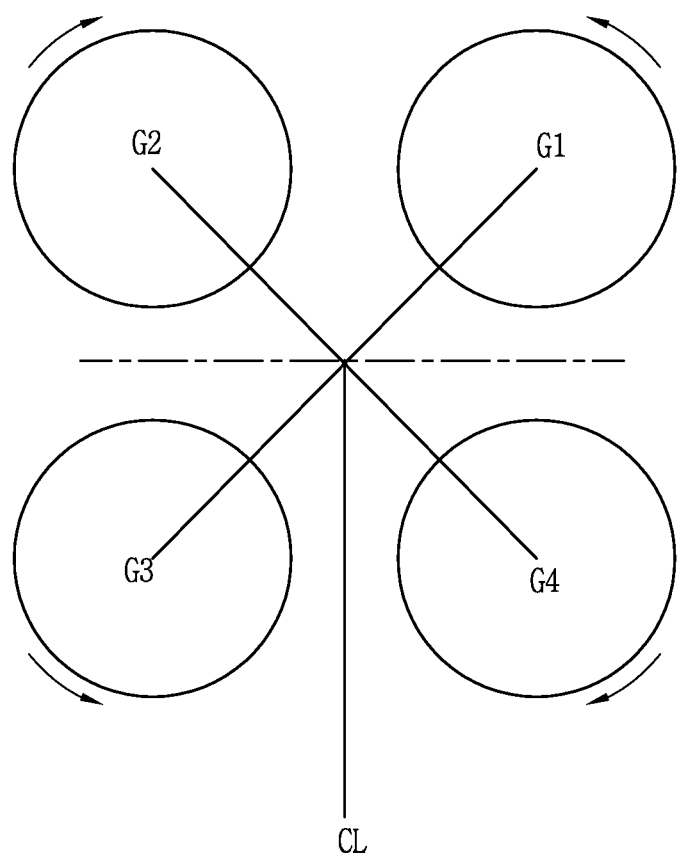
FIG. 7 is a schematic view for explaining the rotational direction control of a blade constituting each unit generator in a multi-type wind turbine according to FIG. 3.

For example, as illustrated in FIG. 7, in case of a wind turbine having four unit generators, the blade of the generator (01) located at the upper right side on the basis of the height directional central line of the tower (CL) may be controlled to be rotated in a clockwise (CW) direction, and the blade of the generator (G2) located at the upper left side in a counter-clockwise (CCW) direction, and the blade of the generator (G3) located at the lower left side in a counter-clockwise (CCW) direction, and the blade of the generator (G4) located at the lower right side in a clockwise (CW) direction. However, according to circumstances, it may be implemented in various ways such that the blades of the generators (G1, G4) located at the right side and the blades of the generators (G2, G3) located at the left side may be controlled to be rotated in different directions from each other, or the blades of the generators (G1, G2) located at the upper side and the blades of the generators (G3, G4) located at the lower side may be controlled to be rotated in different directions from each other.

As described above, in a multi-type wind turbine according to the present embodiment, when wind blows as in a typical horizontal type wind turbine, the blades 50 of the each unit generator (G1, G2, G3, G4) are rotated and its rotational force is converted into electrical energy to generate electricity.

At this time, the unit generator (G1, G2, G3, G4) cancels out a rotational moment generated from the each unit generator (G1, G2, G3, G4) as the blades 50 are rotated in opposite directions around the horizontal or vertical shaft or symmetrically rotated in a diagonal direction based on the installed locations, thereby reducing an eccentric load in the left-right direction. As a result, it may be possible to implement a large sized wind turbine.

On the other hand, in a multi-type wind turbine according to the present disclosure, as a plurality of unit generators are provided therein, the weight of an entire wind turbine will be increased as well as an eccentric load in the top-down direction due to a difference of the wind speed will be increased based on a height at which the each unit generator is installed. Such an eccentric load in the top-down direction will be a restriction on implementing a large sized wind turbine, similarly to an eccentric load in the left-right direction.

In other words, in the foregoing embodiment, the rotational direction of the blade is differentiated based on the installation locations of each unit generator to cancel out a rotational moment generated from the each unit generator, thereby reduce an eccentric load in the left-right direction. However, in the present embodiment, a wind speed corresponding controller for controlling the rotation speed (RPM) and tilt angle (pitch) of the blade 50 based on the installation heights of each unit generator is provided therein to cancel out a difference between wind speeds based on a difference of the installation height of each unit generator.

For example, a load difference between the upper and lower unit generators may be cancelled out by increasing the rotation speed of the blade of the unit generator located at the lower side to be greater than that of the blade of the unit generator located at the upper side or increasing the tilt angle of the blade of the unit generator located at the lower side to be greater than that of the blade of the unit generator located at the upper side among the unit generators.

Figure 9:
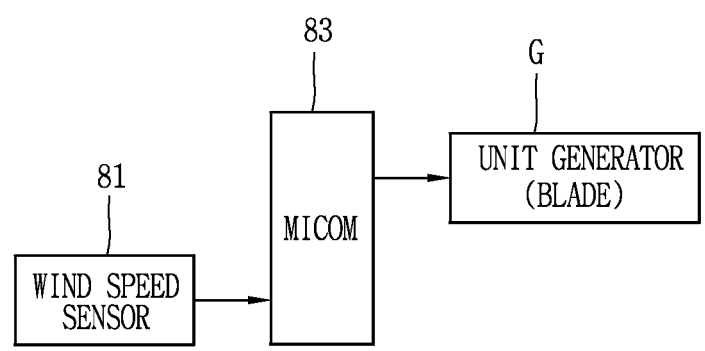
FIG. 9 is a block diagram illustrating a wind speed corresponding controller for contolling a blade of each unit generator according to FIG. 7.

To this end, as illustrated in FIG. 9, a wind speed sensor 81 for detecting a wind speed is provided in the sub-nacelle 40 (a front side of the wind turbine), and a control unit 83 (hereinafter, micom) for receiving a value detected by the wind speed sensor 81 to control the rotation speed of the blade 50 of the relevant unit generator (G1, G2, G3, G4) or control the tilt angle of the blade 50 thereof based on a change of wind speed may be provided in the sub-nacelle 40.

Here, the rotation speed and tilt angle of the blade 50 may be preferably controlled independently for each unit generator (G1, G2, G3, G4), but according to circumstances they may be divided into the unit generators (G3, G4) located at the lower side and the unit generators (G1, G2) located at the upper side on the basis of any one height (for example, main nacelle) of the tower 10 to control the unit generators of each group in a grouped manner. Though not shown in the drawing, the region of unit generators may be divided in various ways such as dividing into the upper, the middle, and lower sides, or the like in addition to dividing into the upper and lower sides.

On the other hand, another embodiment for reducing an eccentric load in the top-down direction in a multi-type wind turbine according to the present disclosure will be described as follows.

In other words, the foregoing embodiment relates to a method of controlling the rotation speed or tilt angle of the blade of the unit generator for each location, but the present embodiment relates to a method of reducing an eccentric load in the top-down direction by changing the size of the blade for each location.

Figure 8:
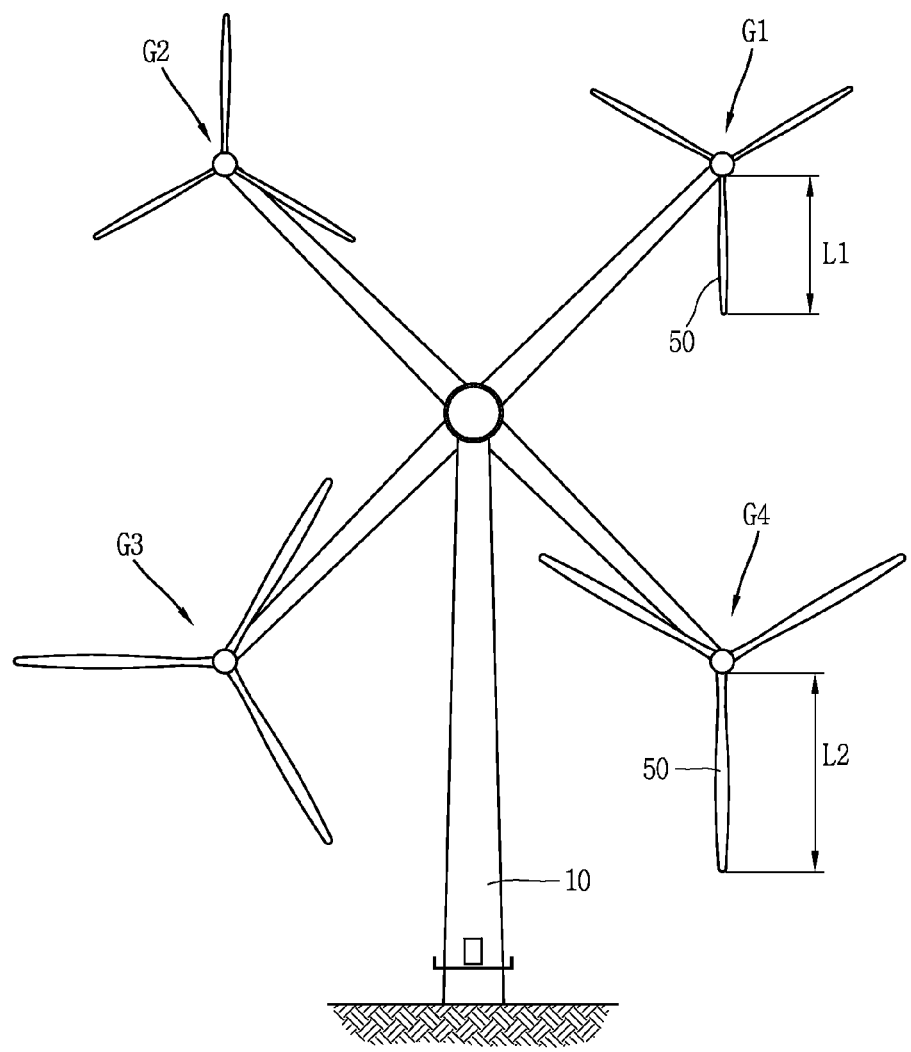
FIG. 8 is a front view illustrating another example of each unit generator in a multi-type wind turbine according to FIG. 3.

As illustrated in FIG. 8, the size of the blade of the unit generator located at the lower side may be increased by forming such that the blade length (L1) of the unit generator (G3, G4) located at the lower side with a relatively low wind speed is greater than the blade length (L2) of the unit generator (G1, G2) located at the upper side with a relatively high wind speed, thereby cancelling out an eccentric load in the top-down direction between unit generators based on the wind speed differences.

In this manner, the unit generator cancels out a rotational moment between adjoining generators by rotating the blades in opposite directions to each other for the adjoining unit generators, thereby reducing an eccentric load in the left-right direction between the unit generators, and otherwise, the rotation speed and tilt angle of the blade of the unit generator located at the lower side are controlled to be greater than those of the unit generator located at the upper side or the size thereof to be greater than that of blade located at the upper side, thereby cancelling out an eccentric load in the top-down direction between the unit generators. Through this, the capacity of each unit generator may be further increased, thereby implementing a large-sized and stabilized wind turbine.

On the other hand, in a multi-type wind turbine according to the present disclosure, as a plurality of unit generators are located at a front side of the tower, stress may be concentrated on a stationary point supporting the unit generator, and members coupled to one another may be damaged by the stress concentration at the stationary point. Accordingly, the present embodiment is to reduce an eccentric load in the front-rear direction, thereby reducing stress concentration at the coupling portion.

In other words, according to the foregoing embodiment, the main nacelle 20 is combined with an upper end of the tower 10 in a perpendicular direction, but in this case, even when both stationary points (A, B) of the support arm 30 are arranged at both sides of the tower 10, respectively, the stationary point (B) at which the unit generator (G) is combined with the support arm 30 may be eccentrically located on the basis of the stationary point (C) at which the main nacelle 20 is fixed to the tower 10, thereby causing damage due to stress concentration on the stationary point (C).

Figure 10:
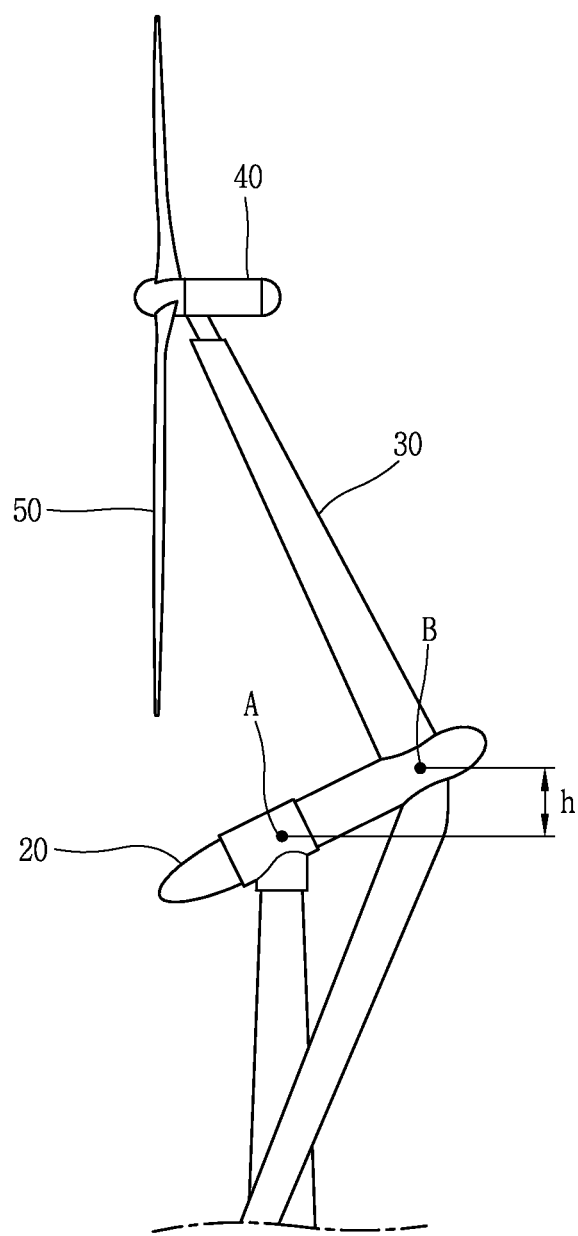
FIG. 10 is a side view illustrating another embodiment for a main nacelle installation structure in a wind turbine according to FIG. 4.

According to the present embodiment, as illustrated in FIG. 10, the main nacelle 20 is combined with respect to the tower 10 in an inclined manner by a predetermined angle to reduce a load in the top-down direction. In this case, the height of the second stationary point (B) at which the support arm 30 is combined with the main nacelle 20 is higher than that of the third stationary point (C) at which the main nacelle 20 is combined with the tower 10 by a predetermined height difference (h). Accordingly, a load applied to the third stationary point (C) may be cancelled out to some extent, thereby reducing a stress being concentrated on the third stationary point (C).

On the other hand, in a multi-type wind turbine according to the present disclosure, a plurality of unit generators are arranged around the tower in a radial direction, and thus there may be anxiety in which a support arm for supporting the unit generator can be bent or twisted. Accordingly, the present embodiment is to prevent the support arm for supporting each unit generator from being deformed.

In other words, according to the foregoing embodiment, though each unit generator is combined with the second end of the support arm, the support arms are independently combined with the main nacelle. However, in this case, the support arm may be bent due to its own weight and a weight of the unit generator, thereby reducing the reliability of a wind turbine as well as hindering the implementation of a large-sized wind turbine.

Figure 11:
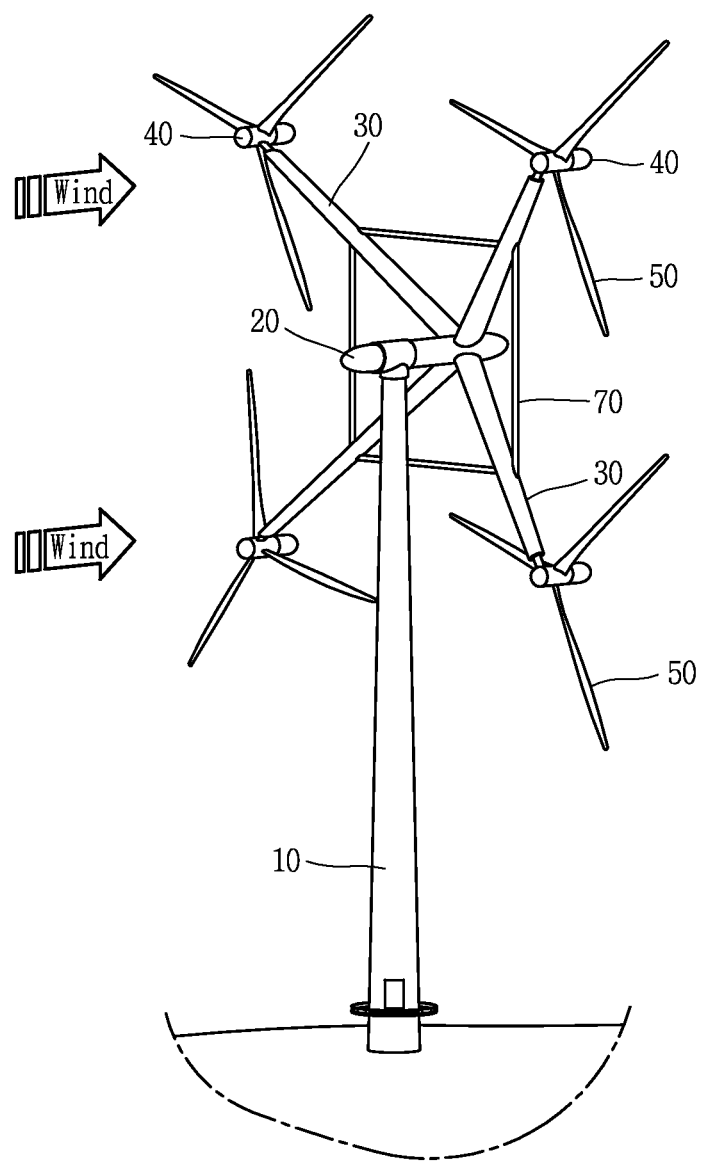
FIG. 11 is a perspective view illustrating an embodiment for reinforcing the structural strength of a support arm in a wind turbine according to FIG. 3.

Taking this into consideration, according to the present embodiment, each of the support arms 30 is connected to at least one reinforcement frame 70, thereby allowing the each support arm 30 to support one another as illustrated in FIG. 11. Through this, a structural strength of the each support arm 30 may be enhanced to reduce an eccentric load as well as increase the length of the support arm 30 and the wind amount of the blade 50, thereby enhancing the electricity generation capacity of a wind turbine as a whole.

Figure 12:
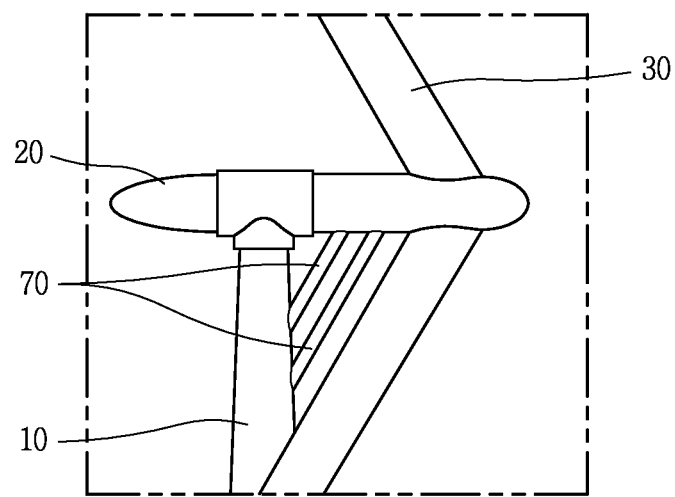
FIGS. 12 and 13 are side views illustrating embodiments of a reinforcement structure supporting a main nacelle in a wind turbine according to FIG. 3.
Figure 13:
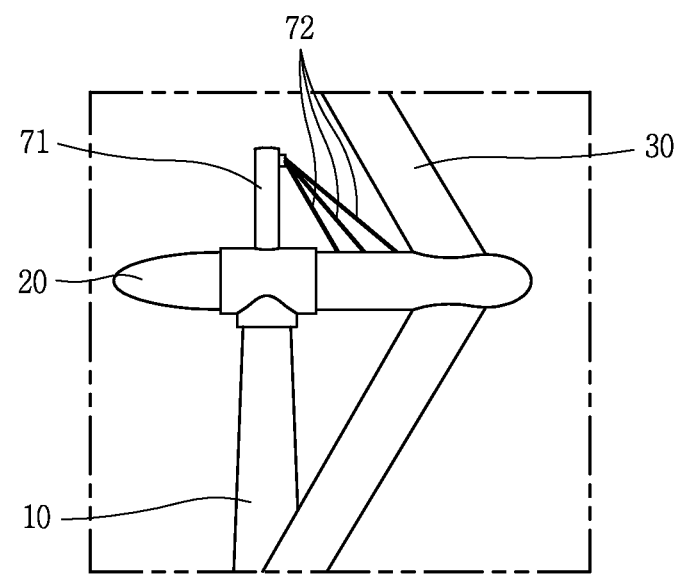

Here, the reinforcement frame 70 may be connected and installed between each support arm 30 as illustrated in FIG. 11, but may be also installed between the tower 10 and the main nacelle 20. For example, the reinforcement frame 70 may be combined with the tower 10 and installed to hold up and support a bottom surface of the main nacelle 20 as illustrated in FIG. 12, and may be also installed such that a tower 71 is extended and formed on an upper surface of the main nacelle 20 in the same direction as the tower 10 and the reinforcement frame 70 is suspended and supported by a frame or cable 72 as illustrated in FIG. 13.

Furthermore, though not shown in the drawing, the reinforcement frame may be combined with the support arm to hold up and support a bottom surface of the sub-nacelle.

Figure 14:
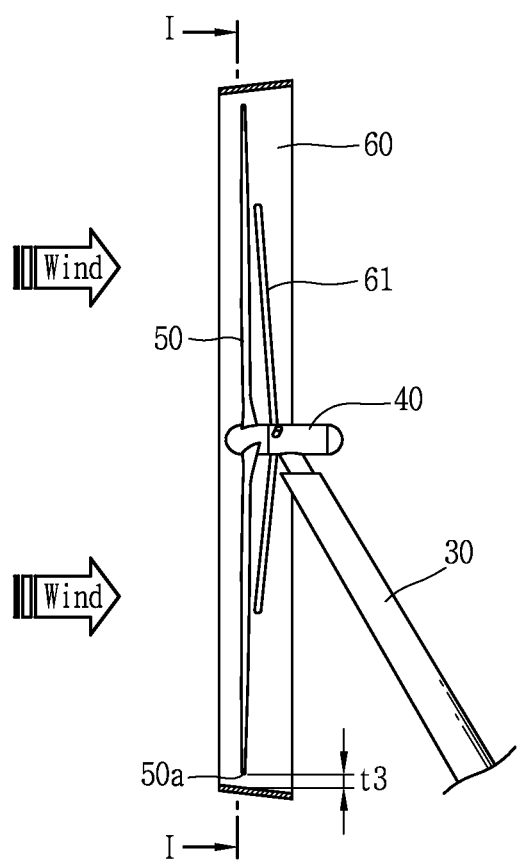
FIG. 14 is a side view illustrating an embodiment of a blade having a duct in a wind turbine according to FIG. 4.
Figure 15:
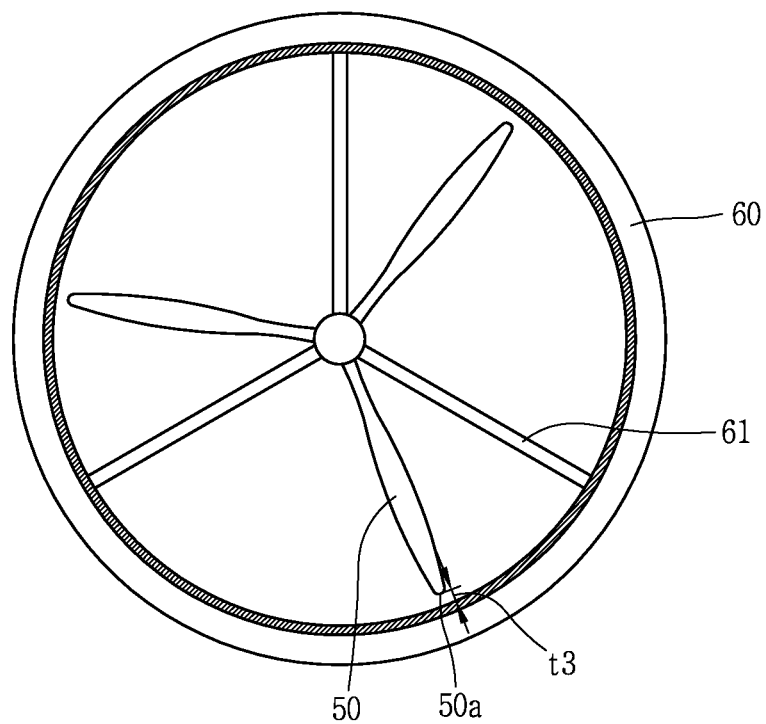
FIG. 15 is a cross-sectional view along line "I-I" in FIG. 14.

On the other hand, in a multi-type wind turbine according to the present disclosure, a duct may be provided at a circumferential surface of the blade to enhance the aerodynamic efficiency and increase the amount of electricity generation. For example, as illustrated in FIGS. 14 and 15, a duct 60 may be installed in the vicinity of an edge 51 of the blades 50 to surround the blades 50 and guide wind in the blade direction. The duct 60 may be installed such that the blades 50 are independently rotated in a state of maintaining a predetermined gap (t1) from the edge 51 of the blade 50. To this end, the duct 60 may be formed in a ring shape and fixed and combined with the sub-nacelle 40 by a plurality of ribs 61.

Furthermore, though not shown in the drawing, the duct may be combined with an edge of each blade and formed together with the blade. In this case, a rib for fixing the duct may not be additionally required.

As described above, the duct 60 may be installed around the edge 50a of the blades 50 to allow an application with a wide range of wind speed, generate a large output against the same wind speed, and allow an application with an increased number of rotations due to reduced noise, thereby achieving the miniaturization and light weight of a wind turbine with the same capacity.

Figure 16:
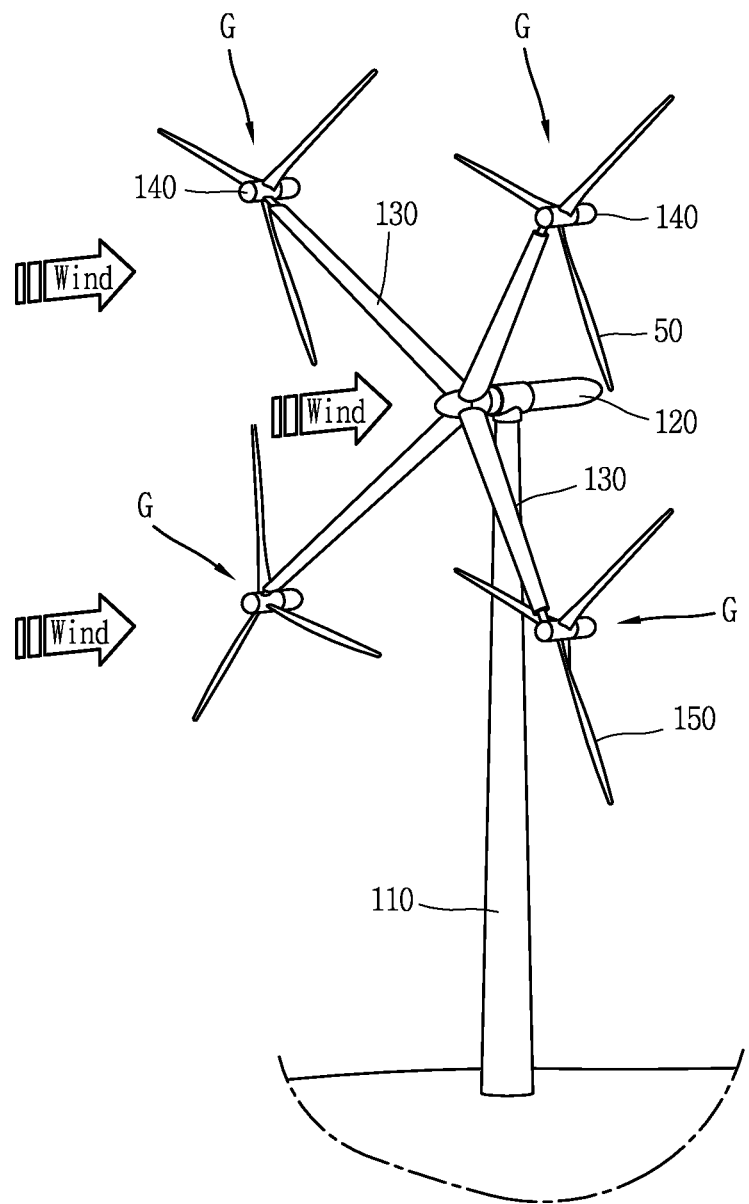
FIG. 16 is a perspective view illustrating another embodiment of a multi-type wind turbine according to the present disclosure.

On the other hand, according to the foregoing embodiment, the support arm is fixed and installed at the main nacelle, but according to the present embodiment, the support arm may be rotatably combined with the main nacelle, thereby further increasing the aerodynamic efficiency. FIG. 16 is a perspective view illustrating another embodiment of a multi-type wind turbine according to the present disclosure, and FIG. 17 is a side view illustrating a wind turbine according to FIG. 16, and FIG. 18 is a block diagram illustrating a wind speed corresponding controller for controlling a blade of each unit generator according to FIGS. 16 and 17.

Figure 17:
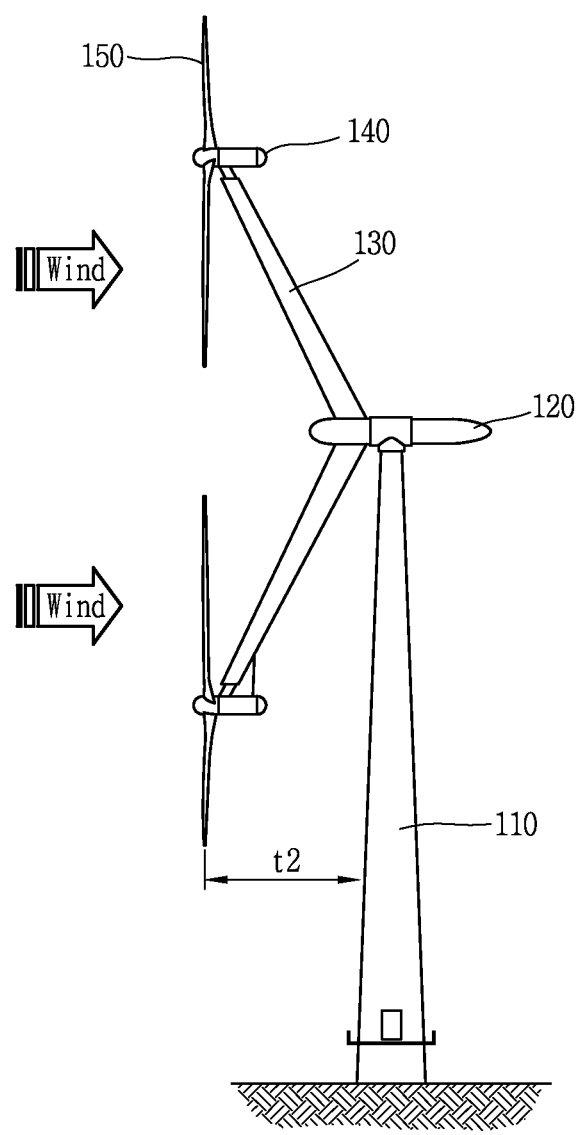
FIG. 17 is a side view illustrating a wind turbine according to FIG. 16.
Figure 18:
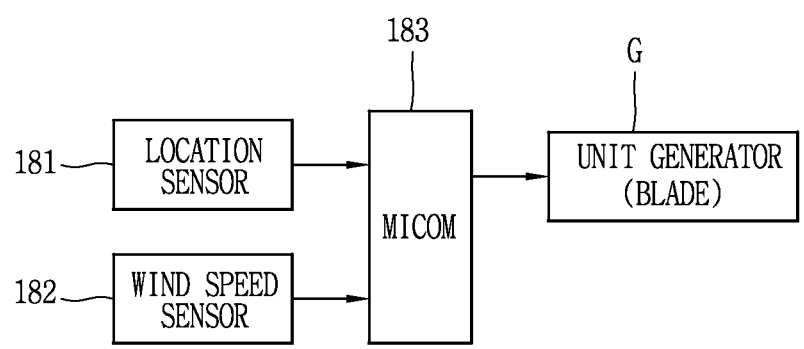
FIG. 18 is a block diagram illustrating a wind speed corresponding controller for controlling a blade of each unit generator according to FIGS. 16 and 17.

As illustrated in FIGS. 16 and 17, even in case where the support arm according to the foregoing embodiment is rotatably combined with the main nacelle 120 (correctly speaking, it is a rotor assembly combined with the main nacelle, but described to be combined with the main nacelle, for the sake of convenience) to perform the role of a kind of blade (hereinafter, commonly referred to as a blade arm 130), the foregoing embodiments will be applicable thereto in the same manner.

However, according to the present embodiment, the blade arm 130 combined with the main nacelle 120 should be rotated with respect to the main nacelle 120 contrary to the support arm in the related art, and thus both ends of the blade arm 130 should be located at a front side thereof on the basis of a height directional central line of the tower to be combined with the main nacelle 120. Even in this case, a blade (hereinafter, sub-blade) 150 rotatably combined with the sub-nacelle 140 may be preferably combined therewith in an upwind format such that an edge of the sub-blade 150 is separated from the tower 10 by a predetermined distance.

Furthermore, when the blade arm 130 is rotated as in the present embodiment, a configuration or control method for cancelling out an eccentric load the unit generator (G) may be different from the foregoing fixed type wind turbine because each unit generator (G) moves along a circumferential direction. In other words, according to the present embodiment, a location sensor 181 for detecting the location of the sub-nacelle 140 to transfer it to the micom 183 is installed in the sub-nacelle 140, respectively, to monitor the location of the unit generator (G) in real time (or periodically), and a wind speed sensor 182 for detecting a wind speed to transfer it to the micom 183 is installed at the sub-nacelle 140 (or at a front side of the wind turbine), and a control unit (micom) for receiving values detected by the location sensor 181 and wind speed sensor 182 to control the rotation speed of the blade 150 of the relevant unit generator (G) or controlling the tilt angle of the blade 150 based on a change of wind speed may be installed at the sub-nacelle 140.

Here, the main nacelle 120 and blade arm 130 may also constitute a kind of unit generator (G), and thus the rotation speed and tilt angle of the blade arm 130 may be controlled by the micom 183.

Furthermore, the micom 183 is rotated along a circumferential direction of the unit generator (G), and thus it may be preferable to implement the rotation speed and tilt angle of the unit generator (G) in an individual manner. However, according to circumstances, as illustrated in FIG. 7, it may be divided into four quadratic regions, and the unit generators falling on the region may be controlled in a grouped manner.

Furthermore, as in the present embodiment, when the blade arm 130 is rotatably combined with the main nacelle 120, each unit generator (G) moves along a circumferential direction, and thus it may be possible to control the rotation speed and tilt angle of the relevant blade 150 to be changed when the unit generator (G) falls on a predetermined region. To this end, a bi-directionally rotatable rotor may be applied to a rotor provided in each unit generator (G). In this case, when there are a large number of blade arms 130 or an odd number of blade arms 130 are installed therein, the rotation direction of the blade 150 may be changed as the need arises, thereby effectively cancelling out the eccentric load.

Furthermore, since the blade arm 130 is rotated around the main nacelle 120, the blade arm 130 should maintain a fixed state for the maintenance of the unit generator (G), or the like. Taking this into consideration, according to the present embodiment, a braking unit (not shown) for restricting the rotation of a rotor combined with the blade arm 130 on the main nacelle 120 may be further provided in the tower 110 or main nacelle 120.

Figure 19:
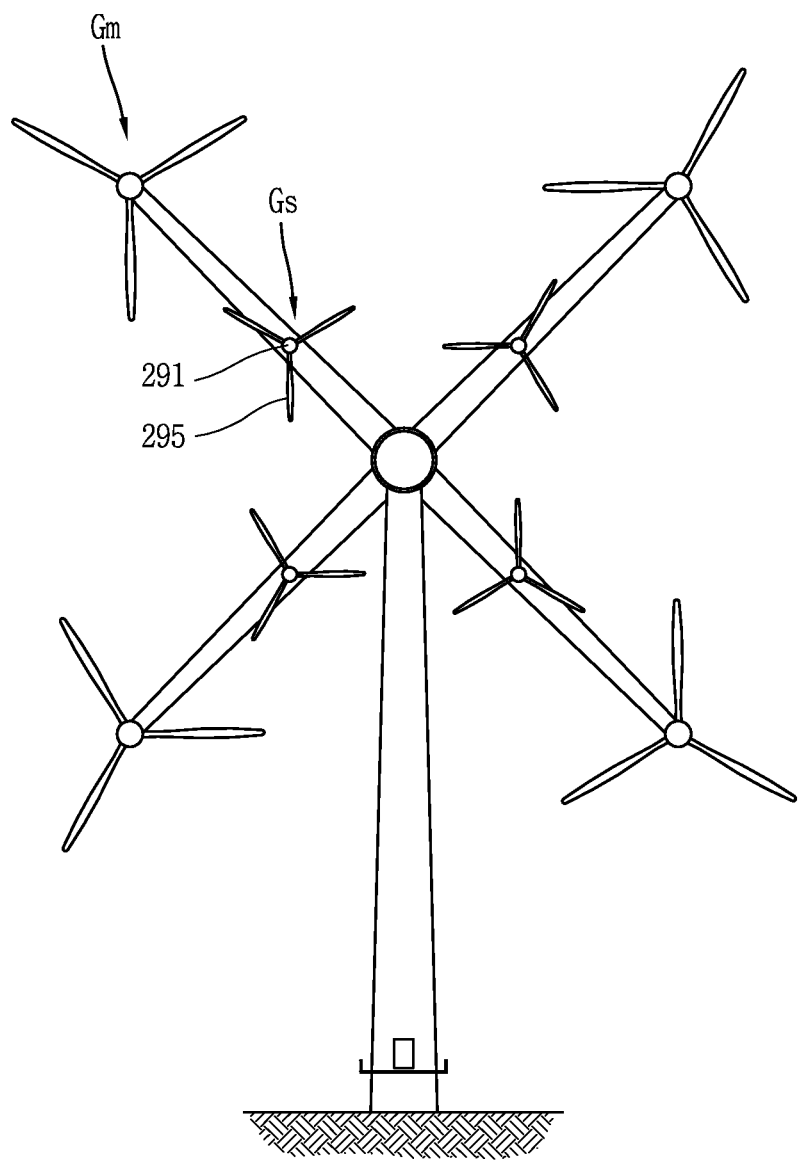
FIG. 19 is a perspective view illustrating another embodiment for a multi-type wind turbine according to the present disclosure.

On the other hand, according to the foregoing multi-type wind turbine, as illustrated in FIG. 19, a separate unit generator (hereinafter, sub-unit generator (Gs)) may be further provided in the support arm. Even in this case, the foregoing embodiment may be also applicable thereto in the same manner.

However, according to the present embodiment, the size of the sub-nacelle 291 and blade 295 of the sub-unit generator (Gs) may be preferably formed less than that of the blade 250 of the unit generator (hereinafter, main unit generator (Gm)) installed at an end of the support arm (or blade arm 230) to increase a rotation radius of the blade.

Furthermore, in this case, it may be controlled such that the blade rotation directions of the main unit generator (Gm) and sub-unit generator (Gs) are opposite to each other. Through this, it may be possible to more effectively cancel out an eccentric load in the left-right direction.

On the other hand, another embodiment of a multi-type wind turbine according to the present disclosure will be described below.

In other words, according to the foregoing embodiment, the blades of the unit generators are the same in their size and shape, but according to the present embodiment, the blades of the unit generators are different in their size and shape to cope with various wind speed conditions.

Figure 20:
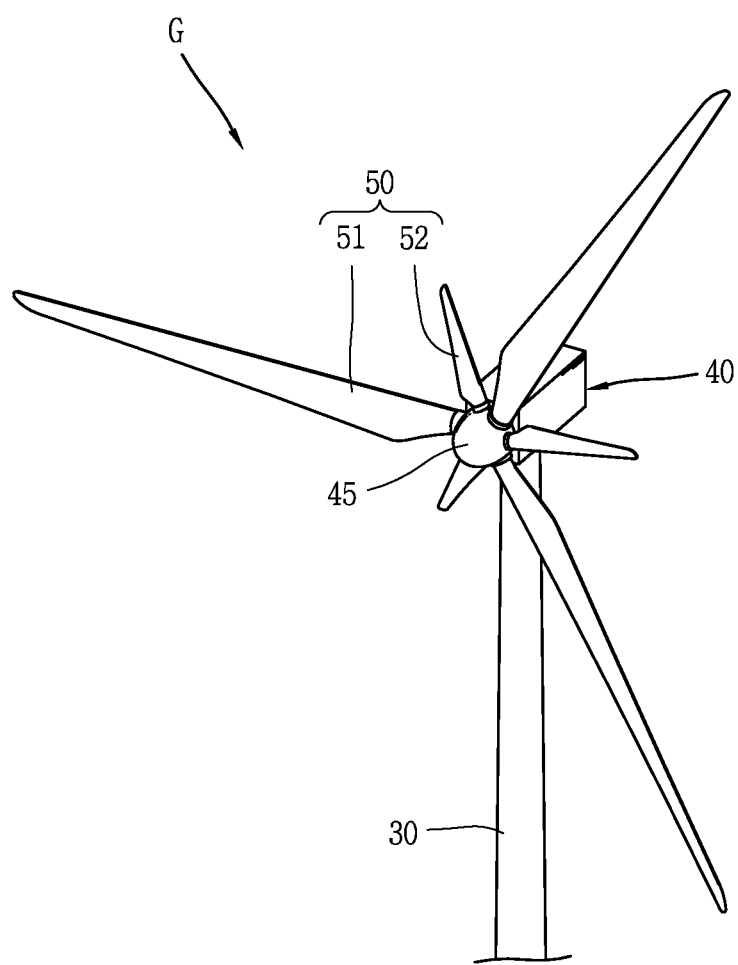
FIGS. 20 and 21 are perspective view and a front view illustrating another embodiment of a multi-type wind turbine according to the present embodiment.
Figure 21:
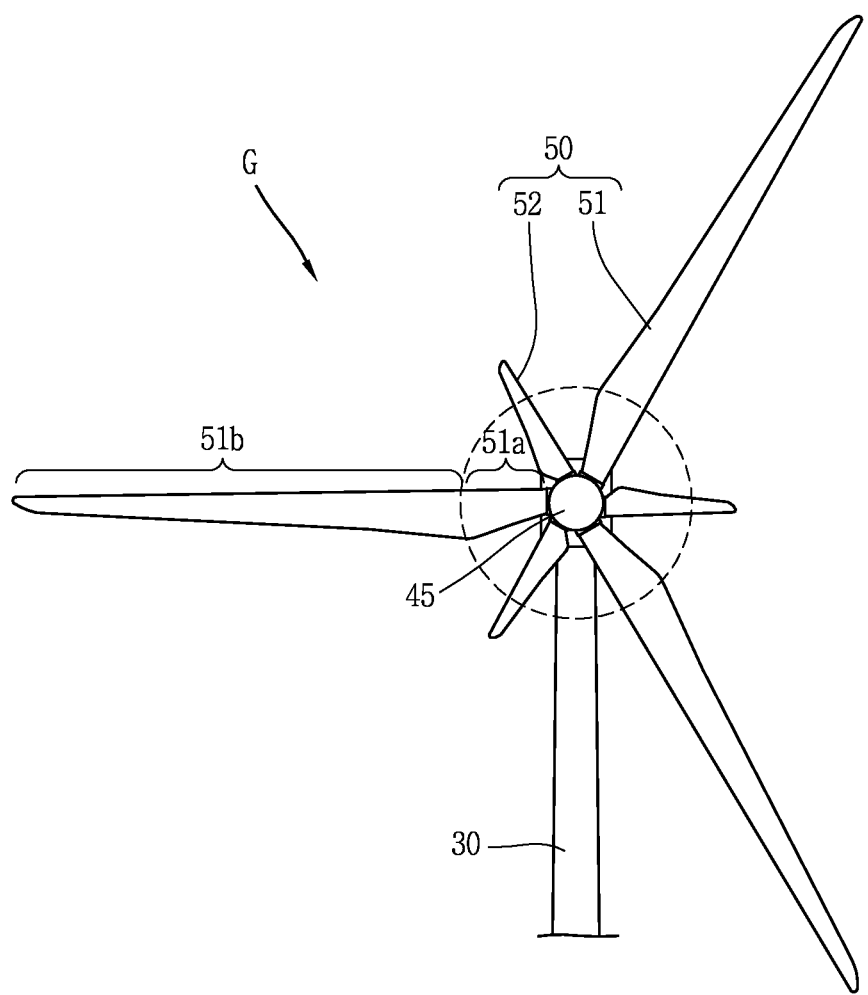

FIGS. 20 and 21 are perspective view and a front view illustrating another embodiment of a multi-type wind turbine according to the present embodiment.

As illustrated in the drawing, for the unit generator (G) in a wind turbine according to the present embodiment, a hub 45 for rotating a turbine shaft is provided at one side of the nacelle 40, and a main blade 51 and a sub-blade 52 are integrally formed or combined with each other in a detachable manner using a separate vane mounting portion (not shown) in the hub 45. In case where the main blade 51 and sub-blade 52 are separated from each other, each vane mounting portion is electrically connected to an angle controller of a separate power control unit (not shown), thereby controlling the main blade or sub-blade to vary its aerodynamic surface angle.

As illustrated in FIG. 20, the main blade 51 and sub-blade 52 are alternately arranged on the same line along a circumferential direction. Furthermore, a stationary portion 51a is formed in a pillar shape close to a circular cross section or circularity in the vicinity of a blade root of the main blade 51, and an aerodynamic surface 51b may be formed in a plate shape having a curved surface from an end of the stationary portion 51a to a blade tip of the main blade 51. The aerodynamic surface 51b may be formed such that a cross sectional area thereof is gradually decreased as being close to a blade tip thereof.

The sub-blade 52 may be formed in a substantially similar shape to the main blade 51. However, the sub-blade 52 may be formed with a vane length and width less than those of the main blade 51, respectively, and preferably formed with a size to the extent that an aerodynamic surface (no reference numeral) of the sub-blade 52 can exist in a blade root portion of the main blade 51.

Furthermore, the sub-blade 52 may be rotatably combined with the hub 45 to implement a variable pitch type blade in which an angle of the blade is varied based on the wind speed conditions, but it may be fixed and combined with the hub 45 to implement a fixed pitch type blade in which an angle of the blade is fixed when the sub-blade 52 is formed much smaller than the main blade 51.

Furthermore, though not shown in the drawing, a plurality of sub-blades 52 may be provided between the main blades 51, and may be formed in a different shape, for example, in a fanwise shape in which the surface area becomes broader as being close to an edge thereof.

Furthermore, the main blade and sub-blade may be independently combined with a motor connected to the angle controller, respectively, and thus controlled in an individually manner, but a plurality of blades may be controlled in a grouped manner for one motor using belts, chains or the like.

As described above, according to a multi-type wind turbine having a main blade and a sub-blade, the unit generator may start to quickly generate electricity by sub-blades even in a low wind speed condition with a low wind amount, and moreover, wind passing through the vicinity of a blade root of the main blade exerts an effect on the sub-blade to add an aerodynamic performance at a low wind speed, thereby generating an additional amount of energy production.

Moreover, the starting wind speed and rated wind speed thereof may be reduced to enhance the amount of annual energy production (AEP). In this case, the rotation radius of the sub-blade may be preferably formed to be greater than 50% compared to the rotation radius of the main blade to enhance the AEP. However, when the rotation radius of the sub-blade is formed too large, the load may be increased to increase the starting wind speed and rated wind speed thereof, and thus the rotation radius of the sub-blade may be preferably formed to be approximately less than 75% compared to the rotation radius of the main blade.

Furthermore, it may be possible to decrease the number of rated rotations as well as reduce the rotation speed as a torque is increased due to the sub-blade, thereby reducing noise that can be generated during the high-speed rotation of the blade.

What is claimed is:

1. A multi-type wind turbine, comprising:
   a tower;
   a plurality of arms provided in the tower in a radial direction;
   a nacelle provided at each of the arms, respectively, to form a unit generator; and
   a blade combined with the nacelle, respectively, to form a unit generator together with the nacelle,
   wherein at least two of the unit generators have opposite blade rotation directions to each other,
   wherein the arm is inclined has a first point fixed to the tower that is located at a rear side of a height directional central line of the tower and a second point combined with the unit generator that is located at a front side of the height directional central line of the tower, and
   wherein the front side is an upstream side and the rear side is a downstream side of the tower, respectively, according to a flowing direction of wind.

2. The multi-type wind turbine of claim 1, wherein the unit generators adjacent to each other along a circumferential direction have opposite blade rotation directions to each other.

3. The multi-type wind turbine of claim 1, wherein the unit generators are classified into a plurality of regions based on the height direction of the tower such that the rotation speeds, tilt angles or lengths of the blades are different from one another based on the region.

4. The multi-type wind turbine of claim 1, wherein the plurality of arms are fixed and combined with the tower.

5. The multi-type wind turbine of claim 1, wherein a controller for controlling the rotation speed or tilt angle of the blade of the unit generator is further provided in the unit generator.

6. The multi-type wind turbine of claim 1, wherein the arm further comprises a transfer unit for maintenance.

7. The multi-type wind turbine of claim 1, wherein the blade is combined with a wind direction in a upwind format.

8. The multi-type wind turbine of claim 1, wherein the blade has a duct to surround each blade edge.

9. The multi-type wind turbine of claim 1, wherein a blade of the unit generator comprises a main blade having a large rotation radius and a sub-blade having a small rotation radius.

10. A multi-type wind turbine, comprising:
    a tower;
    a plurality of arms fixed to the tower in a radial direction;
    a nacelle provided at each of the arms, respectively, to form a unit generator; and
    a blade combined with the nacelle, respectively, to form a unit generator together with the nacelle,
    wherein the arm has a first point fixed to the tower that is located at rear side of a height directional central line of the tower and a second point combined with the unit generator that is located at a front side of the height directional central line of the tower, and
    wherein the front side is an upstream side and the rear side is a downstream side, respectivly, according to a flowing direction of wind.

11. The multi-type wind turbine of claim 10, wherein the plurality of arms are combined with one another by means of a reinforcement member.

12. The multi-type wind turbine of claim 10, wherein the plurality of arms are supported by a reinforcement member combined with the tower.

13. A multi-type wind turbine, comprising:
    a tower;
    a plurality of arms provided in the tower in a radial direction;
    a nacelle provided at each of the the arms, respectively, to form a unit generator;
    a blade combined with the nacelle, respectively, to form a unit generator together with the nacelle; and
    a wind speed corresponding controller configured to control the rotation speed or tilt angle of the blade to correspond to a wind speed,
    wherein at least two of the unit generators have opposite blade rotation directions to each other,
    wherein the wind speed corresponding controller controls the unit generator based on the height thereof,
    wherein the arm is inclined has a first point fixed to the tower that is located at a rear side of height directional central line of the tower and a second point combined with the unit generator that is located at a front side of the height directional central line of the tower, and
    wherein the front side is an upstream side and the rear side is a downstream side, respectively, according to a flowing direction of wind.

14. The multi-type wind turbine of claim 13, wherein the wind speed corresponding controller is electrically connected to a location sensor for detecting the height of the unit generator to control the rotation speed or tilt angle of the blade based on a value detected by the location sensor.

15. The multi-type wind turbine of claim 13, wherein the wind speed corresponding controller controls the rotation speed or tilt angle of the blade for the each unit generator.

16. The multi-type wind turbine of claim 13, wherein the wind speed corresponding controller binds the plurality of unit generators into a plural number of groups to control them in a grouped manner.

17. The multi-type wind turbine of claim 13, wherein the wind speed corresponding controller divides any region based on the height into a plural number of groups, and controls the unit generators falling on the any region to have a predetermined rotation speed or tilt angle.

* * * * *